May 12, 1936. J. J. TOZZI 2,040,286

FRUIT BOX

Filed May 13, 1935

INVENTOR
J. J. Tozzi
BY
ATTORNEY

Patented May 12, 1936

2,040,286

UNITED STATES PATENT OFFICE 2,040,286

FRUIT BOX

John J. Tozzi, New York, N. Y.

Application May 13, 1935, Serial No. 21,116

1 Claim. (Cl. 217—40)

This invention relates generally to fruit boxes and is directed particularly and specifically to a fruit shipping box adapted for use with cherries or other small fruit.

In the cherry shipping boxes now in common use, the side slats of the boxes terminate at or above the plane of the lower edge of the end panels of the box and when the bottom of the box is nailed in place (the boxes being packed in inverted position and the lid affixed lastly), a space is left on each side between the edges of the bottom of the box and the adjacent edges of the side slats. Due to these spaces, when the packed boxes are right side up the outer bottom rows of cherries are caused to protrude somewhat and are often pinched, due to the weight of the cherries above, between these sharp edges of the side slats and bottom of the box causing such cherries to become unsaleable.

It is therefore my principal object to provide a cherry box which will not "pinch" the outer bottom rows of cherries during transit of the box. I also provide a cherry box in which the side slats of the box cannot readily be bent inwardly and result in damage to the cherries.

As already stated, cherry boxes are usually packed in an inverted position, the inverted box being filled with fruit and the bottom of the box nailed in place as the final step of the packing operation. In nailing the bottom of the box in place however, the cherries which are packed high in order to allow for settling, are often pinched between the edges of the side slats when the bottom is forced down against the cherries.

It therefore is another of my objects to provide a novel form of cherry box wherein the cherries will not tend to be pinched against such edges when the box has been packed high and the bottom nailed in place against such cherries, but will instead be rolled and depressed smoothly into the box.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claim.

In the drawing similar characters of reference indicate corresponding parts in the several views.

Figure 1:
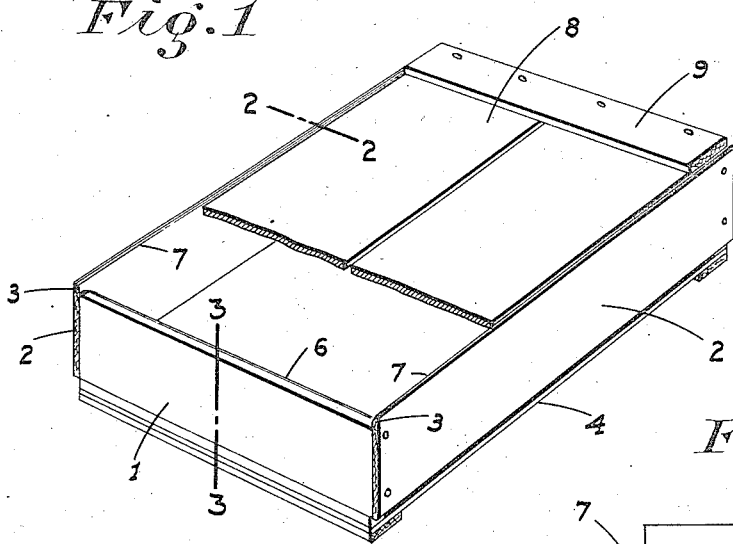
Figure 1 is a perspective view of my improved fruit box illustrating the same in inverted packing position and with the bottom partially broken away.
Figure 2:
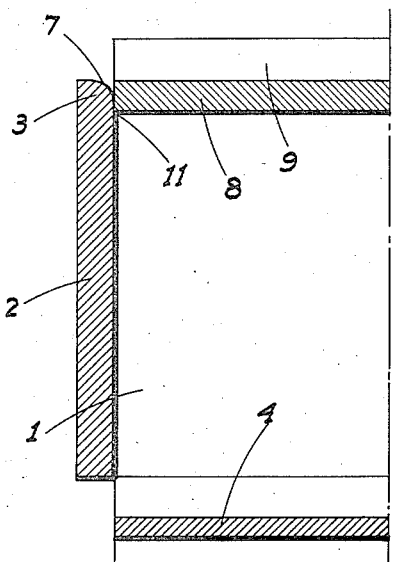
Figure 2 is an enlarged fragmentary transverse section taken on line 2—2 of Figure 1.
Figure 3:
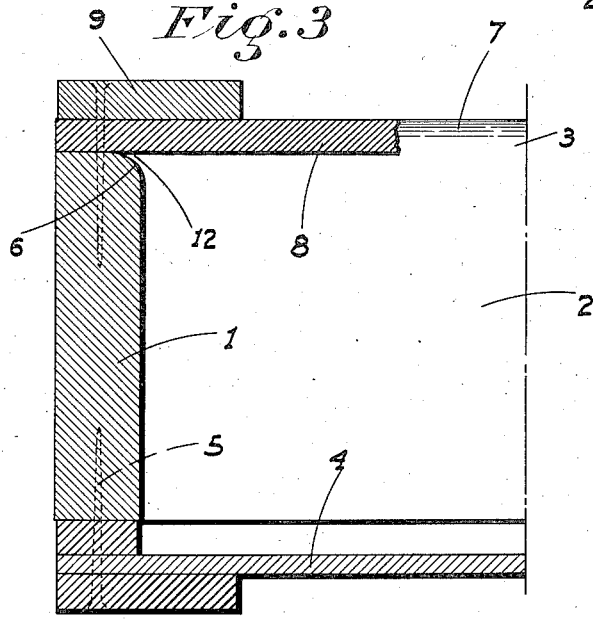
Figure 3 is an enlarged fragmentary longitudinal section taken on the line 3—3 of Figure 1.

Referring now more particularly to the characters of reference on the drawing, my improved fruit box comprises rectangular end panels 1 and side slats 2 which extend beyond the plane of the bottom edge of the end panels as at 3.

The top of the box is closed by the usual form of cleated lid unit 4 nailed to the end panels as at 5. These lid units when removed in order to put the fruit on display have the effect of reducing the height of the end panel which compensates for loss of volume during transit.

The lower edges of the end panels 1 and side slats 2 at the inner corner thereof are rounded as at 6 and 7 respectively for their full lengths. The bottom of the box 8 fits closely between the portions 3 of the side slats which extend beyond the lower edges of the end panels 1 to an extent substantially equal to the thickness of the bottom. Said bottom rests on and is nailed at the cleated ends 9 to the end panels 1.

In packing my improved cherry box, the lid unit is nailed in place and the box inverted and then packed "high" with cherries; some of the cherries bulging over or overhanging the rounded portions 6 and 7 of the end panels and side slats respectively. The bottom is then placed on the cherries and pressed down preparatory to nailing said bottom in place.

It is this latter step that often causes some of the cherries to be "pinched" when a common cherry box is used as heretofore explained. But with the edges rounded as at 6 and 7 the cherries are in effect "rolled" from their overhanging position into the box completely between the side slats without "pinching".

Once the cherries are thus in place in the box with the bottom nailed on, the box is turned right side up for transit. During transit, the outer lower rows of cherries packed in my improved box cannot "pinch" because no crack or space of any appreciable width is left open along the lower edges of the side slats, as in common cherry boxes. The sides of the bottom 8 abut the portion 3 of the side slats 2 and form a closed joint as at 11. Also, due to the fact that the bottom fits closely between the extended portions 3 of the side slats, these side slats are held against undue inward bending caused by other boxes etc. during transit.

Of course my improved box is lined as usual with a thin paper liner or "sheet" which in practice carries advertising matter.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention, what I claim as new and useful and desire to secure by Letters Patent is:

In a fruit box for small fruits adapted to be packed in an inverted position, end panels, side slats secured to and extending below the end panels, and a bottom for the box; the inner corners of the lower edges of the end panels and side slats respectively being rounded for their full length to a substantial degree.

JOHN J. TOZZI.